A. HENDEE.
PISTON-PACKING.

No. 176,629.            Patented April 25, 1876.

WITNESSES            INVENTOR,

UNITED STATES PATENT OFFICE.

ALONZO HENDEE, OF KEY WEST, FLORIDA.

IMPROVEMENT IN PISTON-PACKINGS.

Specification forming part of Letters Patent No. 176,629, dated April 25, 1876; application filed March 18, 1876.

*To all whom it may concern:*

Be it known that I, ALONZO HENDEE, of Key West, in the county of Monroe and State of Florida, have invented a new and valuable Improvement in Piston-Packings; and I do hereby declare that the following is a full, clear, and exact description of the construction and operation of the same, reference being had to the annexed drawings, making a part of this specification, and to the letters and figures of reference marked thereon.

Figure 1:
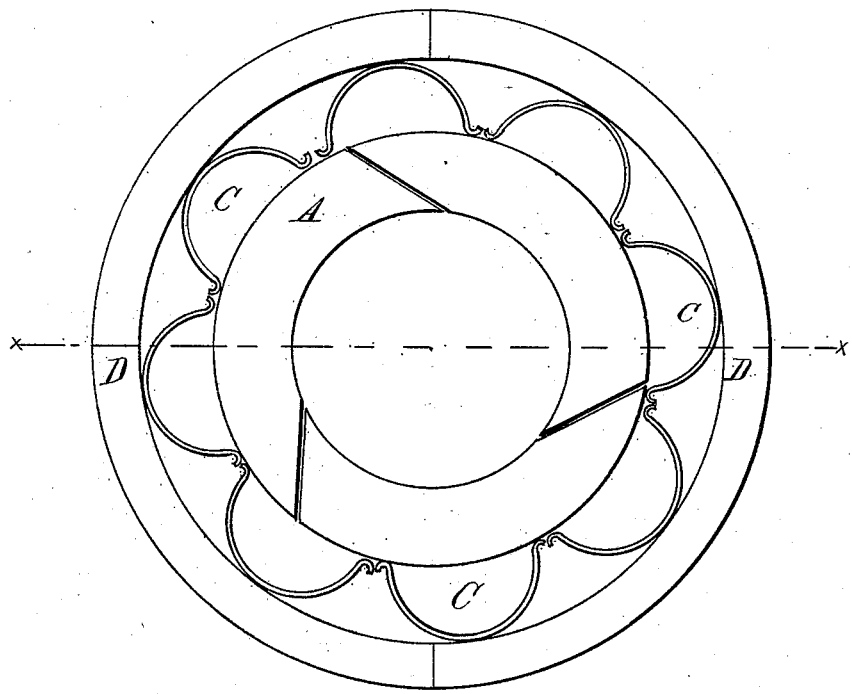
Figure 2:
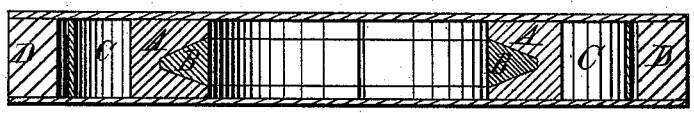

Figure 1 of the drawings is a representation of a plan view of my piston-packing, and Fig. 2 is a longitudinal vertical central sectional view of the same.

The nature of my invention consists in the construction and arrangement of a metallic piston-packing, as will be hereinafter more fully set forth.

In the annexed drawing, A represents the inner ring, made of brass, in three sections, and having a suitably-shaped groove in its inner edge, extending all around, which groove is filled with Babbitt metal B. This sectional ring is placed around the piston, the ends of the sections being cut so as to overlap and close around the piston and make a tight joint as it wears, the sections being held against the piston by means of half-elliptical springs C placed around the outside of them, and within an exterior iron ring, D. This ring D is made in two equal parts, for the purpose of fitting it in without disconnecting the piston.

This packing will last a very long time, and cause less friction on the piston than ordinary packing, thereby saving the power which is wasted in overcoming the friction caused by using hemp packing. It can be made of any size to fit any piston or valve-stem or pump-plunger, and can be renewed—that is, new inside rings put in—in a few minutes' time should they be required.

What I claim as new, and desire to secure by Letters Patent, is—

In a metallic packing for piston-rods or similar devices, the combination of the interior sectional ring A, having the ends of the sections overlapping each other, and provided on the inside with Babbitt metal B, the springs C C', and the exterior bisected ring D, substantially as and for the purpose set forth.

In testimony that I claim the above I have hereunto subscribed my name in the presence of two witnesses.

ALONZO HENDEE.

Witnesses:
F. I. SIMMONDS,
W. J. PHILLIPS.